United States Patent
Seo (10) Patent No.: US 10,687,322 B2
(45) Date of Patent: Jun. 16, 2020

(54) METHOD FOR TRANSMITTING OR RECEIVING SIGNAL IN WIRELESS COMMUNICATION SYSTEM AND APPARATUS THEREFOR

(71) Applicant: LG Electronics Inc., Seoul (KR)

(72) Inventor: Inkwon Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/064,959

(22) PCT Filed: Jun. 4, 2018

(86) PCT No.: PCT/KR2018/006344
§ 371 (c)(1),
(2) Date: Jun. 21, 2018

(87) PCT Pub. No.: WO2018/225998
PCT Pub. Date: Dec. 13, 2018

(65) Prior Publication Data
US 2020/0092855 A1     Mar. 19, 2020

Related U.S. Application Data

(60) Provisional application No. 62/517,181, filed on Jun. 9, 2017.

(51) Int. Cl.
*H04W 72/04* (2009.01)
(52) U.S. Cl.
CPC ........ *H04W 72/042* (2013.01); *H04W 72/044* (2013.01)
(58) Field of Classification Search
None
See application file for complete search history.

(56) References Cited

U.S. PATENT DOCUMENTS

| | | | |
|---|---|---|---|
| 2018/0324770 A1* | 11/2018 | Nogami | H04L 5/0053 370/329 |
| 2019/0098608 A1* | 3/2019 | Yi | H04L 5/0044 370/329 |

(Continued)

FOREIGN PATENT DOCUMENTS

| | | |
|---|---|---|
| CN | 102857977 | 1/2013 |
| KR | 101648647 | 8/2016 |

OTHER PUBLICATIONS

Nokia et al., "On the PDCCH search spaceconfigurationfor NR," 3GPP TSG RAN WG1#89, dated May 15-19, 2017, 5 pages.

(Continued)

*Primary Examiner* — Anh Vu H Ly
(74) *Attorney, Agent, or Firm* — Fish & Richardson P.C.

(57) ABSTRACT

According to an embodiment of this invention, a method of receiving a downlink signal by a user equipment (UE) in a wireless communication system includes receiving a first control resource set (CORESET) configuration including information regarding a frequency resource of a first CORESET, and receiving a physical downlink control channel (PDCCH) signal by bundling a plurality of resource element groups (REGs) on the first CORESET, wherein the information regarding the frequency resource of the first CORESET may be a bitmap, and wherein the bitmap may allocate the frequency resource of the first CORESET in units of 6-RB such that a residual resource that does not belong to any REG bundle is not present in the first CORESET after every 2, 3, or 6 REGs are bundled into 1 REG bundle.

13 Claims, 8 Drawing Sheets

(56) References Cited

U.S. PATENT DOCUMENTS

| | | | |
|---|---|---|---|
| 2019/0215119 A1* | 7/2019 | Kim | H04W 74/0833 370/329 |
| 2019/0229879 A1* | 7/2019 | Yi | H04L 1/0038 370/329 |
| 2019/0260530 A1* | 8/2019 | Yi | H04L 5/0044 370/329 |

OTHER PUBLICATIONS

Panasonic, "Configuration of CORESET and Search space design," 3GPP TSG RAN WG1 Meeting #89, dated May 15-19, 2017, 4 pages.

LG Electronics, "Discussion on CORESET configuration," 3GPP TSG RAN WG1 Meeting #89, dated May 15-19, 2017, 6 pages.

CN Office Action in Chinese Application No. 201880002805.6, dated Oct. 9, 2019, 11 pages (with English translation).

LG Electronics, "Discussion on NR-PDCCH structure", R1-1707625, 3GPP TSG RAN WG1 Meeting #89, Hangzhou, P.R. China, May 15-19, 2017, 3 pages.

Sharp, "REG bundling per CCE for NR PDCCH", R1-1708370, 3GPP TSG RAN WG1 Meeting #89, Hangzhou, China, May 15-19, 2017, 5 pages.

Guangdong OPPO Mobile Telecom, "PDCCH CORESET configuration and UE procedure on NR-PDCCH," 3GPP TSG RAN WG1 meeting #89, dated May 15-19, 2017, 7 pages.

Spreadtrum Communications, "Discussion on NR-PDCCH structure," 3GPP TSG RAN WG1 Meeting #89, dated May 15-19, 2017, 6 pages.

Ericsson, "Overview of DL Control Channel Design," 3GPP TSG-RAN WG1 Meeting #89, dated May 15-19, 2017, 10 pages.

Ericsson, "On NR-PDCCH Structure," 3GPP TSG-RAN WG1 Meeting #89, dated May 15-19, 2017, 5 pages.

Huawei et al., "Configuration of control resource set," 3GPP TSG RAN WG1 Meeting #89, dated May 15-19, 2017, 4 pages.

Huawei et al., "Slot based scheduling for data channels," 3GPP TSG RAN WG1 Meeting #89, dated May 15-19, 2017, 5 pages.

Panasonic, "The relation among RS, REG, CCE, and CORESET," 3GPP TSG RAN WG1 Meeting #89, dated May 15-19, 2017, 5 pages.

ETRI, "Discussion on configuration of search space and CORSET," R1-1708100, 3GPP TSG RAN WG1 #89, Hangzhou, China, dated May 15-19, 2017, 3 pages.

Japanese Office Action in Japanese Application No. 2019-512970, dated Jan. 7, 2020, 9 pages (with English translation).

Samsung, "Search Space Design Parameters," R1-1707989, 3GPP TSG RAN WG1 Meeting #89, Hangzhou, China, dated May 15-19, 2017, 6 pages.

* cited by examiner

METHOD FOR TRANSMITTING OR RECEIVING SIGNAL IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2018/006344, filed on Jun. 4, 2018, which claims the benefit of U.S. Provisional Application No. 62/517,181, filed on Jun. 9, 2017. The disclosures of the prior applications are incorporated by reference in their entirety.

TECHNICAL FIELD

The present invention relates to a wireless communication system, and more particularly, to a method and apparatus for transmitting and receiving a downlink (DL) control channel signal in a wireless communication system.

BACKGROUND ART

Figure 1:
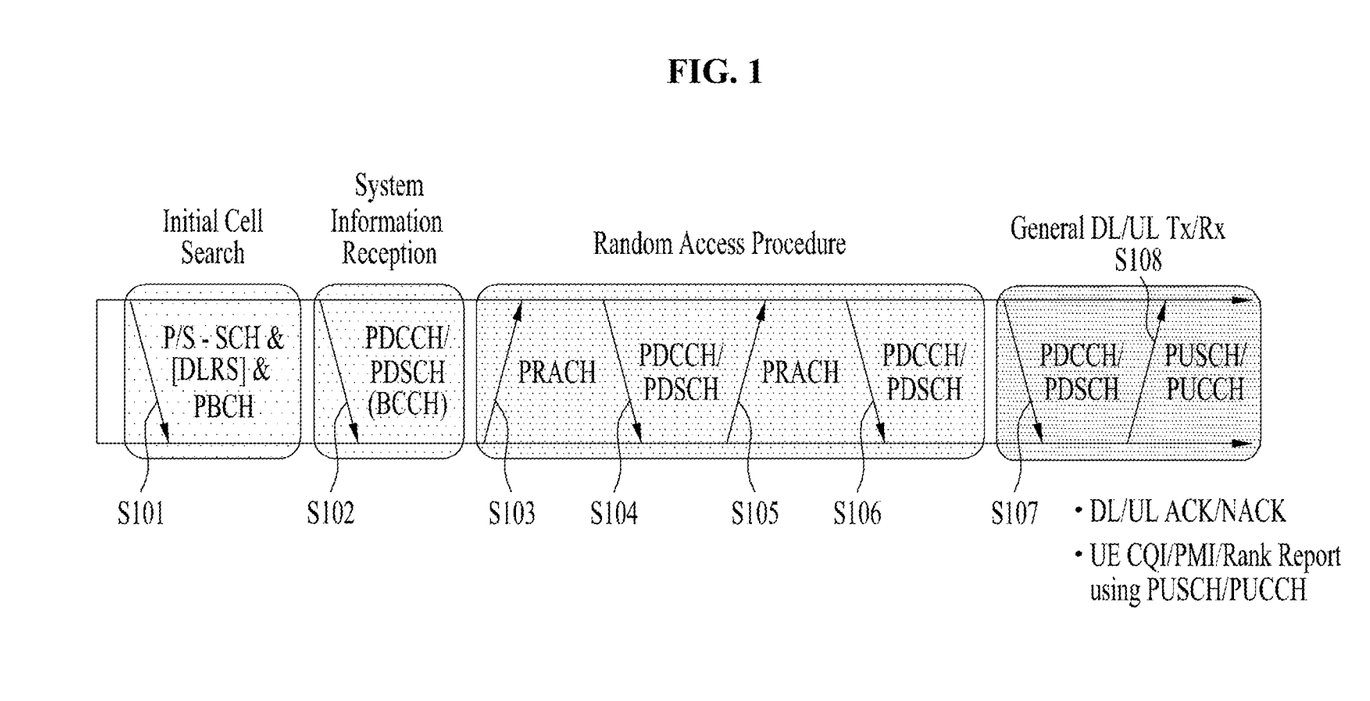
FIG. 1 illustrates physical channels used in a 3GPP LTE/LTE-A system and a general signal transmission method using the physical channels.

First, the existing 3GPP LTE/LTE-A system will be briefly described. Referring to FIG. 1, the UE performs an initial cell search (S101). In the initial cell search process, the UE receives a Primary Synchronization Channel (P-SCH) and a Secondary Synchronization Channel (S-SCH) from a base station, performs downlink synchronization with the BS, and acquires information such as a cell ID. Thereafter, the UE acquires system information (e.g., MIB) through a PBCH (Physical Broadcast Channel). The UE can receive the DL RS (Downlink Reference Signal) and check the downlink channel status.

After the initial cell search, the UE can acquire more detailed system information (e.g., SIBs) by receiving a Physical Downlink Control Channel (PDCCH) and a Physical Downlink Control Channel (PDSCH) scheduled by the PDCCH (S102).

The UE may perform a random access procedure for uplink synchronization. The UE transmits a preamble (e.g., Msg1) through a physical random access channel (PRACH) (S103), and receives a response message (e.g., Msg2) for the preamble through PDCCH and PDSCH corresponding to the PDCCH. In the case of a contention-based random access, a contention resolution procedure such as additional PRACH transmission (S105) and PDCCH/PDSCH reception (S106) may be performed.

Then, the UE can perform PDCCH/PDSCH reception (S107) and Physical Uplink Shared Channel (PUSCH)/Physical Uplink Control Channel (PUCCH) transmission (S108) as a general uplink/downlink signal transmission procedure. The UE can transmit UCI (Uplink Control Information) to the BS. The UCI may include HARQ ACK/NACK (Hybrid Automatic Repeat reQuest Acknowledgment/Negative ACK), SR (Scheduling Request), CQI (Channel Quality Indicator), PMI (Precoding Matrix Indicator) and/or RI etc.

DISCLOSURE

Technical Problem

An object of the present invention devised to solve the problem lies in a method and apparatus for more effectively and accurately transmitting or receiving a signal through a physical downlink control channel (PDCCH) signal in wireless communication system.

It is to be understood that both the foregoing general description and the following detailed description of the present invention are exemplary and explanatory and are intended to provide further explanation of the invention as claimed.

Technical Solution

The object of the present invention can be achieved by providing a method of receiving a downlink (DL) signal by a user equipment (UE) in a wireless communication system, the method including receiving a first control resource set (CORESET) configuration including information regarding a frequency resource of a first CORESET, and receiving a physical downlink control channel (PDCCH) signal by bundling a plurality of resource element groups (REGs) on the first CORESET, wherein the information regarding the frequency resource of the first CORESET is a bitmap; and wherein the bitmap allocates the frequency resource of the first CORESET in units of 6-RB such that a residual resource that does not belong to any REG bundle is not present in the first CORESET after every 2, 3, or 6 REGs are bundled into 1 REG bundle.

In another aspect of the present invention, provided herein is a method of transmitting a downlink (DL) signal by a base station (BS) in a wireless communication system, the method including transmitting a first control resource set (CORESET) configuration including information regarding a frequency resource of a first CORESET and transmitting a physical downlink control channel (PDCCH) signal by bundling a plurality of resource element groups (REGs) on the first CORESET, wherein the information regarding the frequency resource of the first CORESET is a bitmap; and wherein the bitmap allocates the frequency resource of the first CORESET in units of 6-RB such that a residual resource that does not belong to any REG bundle is not present in the first CORESET after every 2, 3, or 6 REGs are bundled into 1 REG bundle.

In another aspect of the present invention, provided herein is a user equipment (UE) for receiving a downlink (DL) signal, including a receiver; and a processor to receive, using the receiver, a first control resource set (CORESET) configuration including information regarding a frequency resource of a first CORESET, and to receive a physical downlink control channel (PDCCH) signal by bundling a plurality of resource element groups (REGs) on the first CORESET, wherein the information regarding the frequency resource of the first CORESET is a bitmap; and wherein the bitmap allocates the frequency resource of the first CORESET in units of 6-RB such that a residual resource that does not belong to any REG bundle is not present in the first CORESET after every 2, 3, or 6 REGs are bundled into 1 REG bundle.

In another aspect of the present invention, provided herein is a base station (BS) for transmitting a downlink (DL) signal, including a transmitter; and a processor to transmit, using the transmitter, a first control resource set (CORESET) configuration including information regarding a frequency resource of a first CORESET, and to transmit a physical downlink control channel (PDCCH) signal by bundling a plurality of resource element groups (REGs) on the first CORESET, wherein the information regarding the frequency resource of the first CORESET is a bitmap; and wherein the bitmap allocates the frequency resource of the first CORESET in units of 6-RB such that a residual resource that does not belong to any REG bundle is not present in the first CORESET after every 2, 3, or 6 REGs are bundled into 1 REG bundle.

The bitmap may be configured specifically to a sub-band in which the UE operates among a plurality of sub-bands. Each of a plurality of bits included in the bitmap may correspond to 6-RB and each bit value indicates whether the corresponding 6-RB is the frequency resource of the first CORESET.

The UE may assume same precoding at least for REGs belonging to a same REG bundle.

The first CORESET configuration may further include REG bundle size information.

An REG bundle size applied to the first CORESET may be determined in consideration of an REG bundle size of a second CORESET that at least partially overlaps with the first CORESET.

When interleaving is configured for only one of the first CORESET and a second CORESET that at least partially overlaps with the first CORESET, the interleaving may be performed based on an REG bundle set including a plurality of REG bundles.

The number of the plurality of REG bundles included in the REG bundle set may be determined according to an aggregation level and the plurality of REG bundles may belong to different control channel elements (CCEs), respectively.

With respect to a CORESET for which the interleaving is not configured, from the first CORESET and the second CORESET, only a first aggregation level set {1, 2, 4, 8} may be available and, with respect to a CORESET for which the interleaving is configured, a second aggregation level set {1, 3, 6, 12} in addition to the first aggregation level set may be available.

An aggregation level set to be applied to the first CORESET may be determined in consideration of at least one of a bundle size configured for the first CORESET and whether interleaving is applied for the first CORESET, and a configuration of a second CORESET that overlaps with the first CORESET.

1 REG may correspond to 1 symbol on a time domain and corresponds to 1 resource block (RB) on a frequency domain.

Advantageous Effects

According to an embodiment of the present invention, since 2, 3, or 6-REGs are bundled to 1 REG bundle in a CORESET for transmission and reception of a PDCCH signal, channel estimation of the PDCCH signal may be more accurately and effectively performed and, since a frequency resource of a CORESET is allocated through a bitmap in units of 6-RBs, a residual resource according to REG bundling may not be generated and, thus, a wireless resource of a CORESET may be more effectively used.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

MODE FOR INVENTION

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited. Specific terminologies used in the following description are provided to help understand the present invention and the use of the terminologies can be modified to a different form within a scope of the technical idea of the present invention.

As many as possible communication devices have demanded as high as communication capacity and, thus, there has been a need for enhanced mobile broadband (eMBB) communication compared with legacy radio access technology (RAT) in a recently discussed next-generation communication system. In addition, massive machine type communications (mMTC) for connecting a plurality of devices and objects to provide various services anytime and anywhere is also one of factors to be considered in next-generation communication. In addition, in consideration of a service/user equipment (UE) that is sensitive to reliability and latency, ultra-reliable and low latency communication (URLLC) has been discussed for a next-generation communication system.

As such, new RAT that considers eMBB, mMTC, URLCC, and so on has been discussed for next-generation wireless communication.

Some LTE/LTE-A operations and configuration that are not at variance to a design of New RAT may also be applied to new RAT. For convenience, new RAT may be referred to as 5G mobile communication.

<NR Frame Structure and Physical Resource>

In an NR system, downlink (DL) and downlink (UL) transmission may be performed through frames having duration of 10 ms and each frame may include 10 subframes. Accordingly, 1 subframe may correspond to 1 ms. Each frame may be divided into two half-frames.

1 subframe may include $N_{symb}^{subframe,\mu} = N_{symb}^{slot} \times N_{slot}^{subframe,\mu}$ contiguous OFDM symbols. $N_{symb}^{slot}$ represents the number of symbols per slot, µ represents OFDM numerology, and $N_{symb}^{subframe,\mu}$ represents the number of slots per subframe with respect to corresponding µ. In NR, multiple OFDM numerologies shown in Table 1 below may be supported.

TABLE 1

| µ | Δf = $2^\mu$ · 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In Table 1 above, Δf refers to subcarrier spacing (SCS). µ and cyclic prefix with respect to a DL carrier bandwidth part (BWP) and µ and cyclic prefix with respect to a UL carrier BWP may be configured for a UE via UL signaling.

Table 2 below shows the number of $N_{symb}^{slot}$ of symbols per slot, the number $N_{slot}^{frame,\mu}$ of symbols per frame, and the number $N_{slot}^{subframe,\mu}$ of slots per subframe with respect to each SCS in the case of normal CP.

TABLE 2

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Table 3 below shows the number $N_{symb}^{slot}$ of symbols per slot, the number $N_{slot}^{frame,\mu}$ of slots per frame, and the number $N_{slot}^{subframe,\mu}$ of slots per subframe with respect to each SCS in the case of extended CP.

TABLE 3

| µ | $N_{symb}^{slot}$ | $N_{slot}^{frame,\mu}$ | $N_{slot}^{subframe,\mu}$ |
|---|---|---|---|
| 2 | 12 | 40 | 4 |

As such, in an NR system, the number of slots included in 1 subframe may be changed according to subcarrier spacing (SCS). OFDM symbols included in each slot may correspond to any one of D (DL), U (UL), and X (flexible). DL transmission may be performed in a D or X symbol and UL transmission may be performed in a U or X symbol. A Flexible resource (e.g., X symbol) may also be referred to as a Reserved resource, an Other resource, or a Unknown resource.

In NR, one resource block (RB) may correspond to 12 subcarriers in the frequency domain. A RB may include a plurality of OFDM symbols. A resource element (RE) may correspond to 1 subcarrier and 1 OFDM symbol. Accordingly, 12 REs may be present on 1 OFDM symbol in 1 RB.

A carrier BWP may be defined as a set of contiguous physical resource blocks (PRBs). The carrier BWP may also be simply referred to as a BWP. A maximum of 4 BWPs may be configured for each of UL/DL link in 1 UE. Even if multiple BWPs are configured, 1 BWP may be activated for a given time period. However, when a supplementary uplink (SUL) is configured in a UE, 4 BWPs may be additionally configured for the SUL and 1 BWP may be activated for a given time period. A UE may not be expected to receive a PDSCH, a PDCCH, a channel state information-reference signal (CSI-RS), or a tracking reference signal (TRS) out of the activated DL BWP. In addition, the UE may not be expected to receive a PUSCH or a PUCCH out of the activated UL BWP.

<NR DL Control Channel>

In an NR system, a transmissions NR system, a transmission unit of a control channel may be defined as a resource element group (REG) and/or a control channel element (CCE), etc. The CCE may refer to a minimum unit for control channel transmission. That is, a minimum PDCCH size may correspond to 1 CCE. When an aggregation level is equal to or greater than 2, a network may group a plurality of CCEs to transmit one PDCCH (i.e., CCE aggregation).

An REG may correspond to 1 OFDM symbol in the time domain and may correspond to 1 PRB in the frequency domain. In addition, 1 CCE may correspond to 6 REGs.

A control resource set (CORESET) and a search space (SS) are briefly described now. The CORESET may be a set of resources for control signal transmission and the search space may be aggregation of control channel candidates for perform blind detection. The search space may be configured for the CORESET. For example, when one search space is defined on one CORESET, a CORESET for a common search space (CSS) and a CORESET for a UE-specific search space (USS) may each be configured. As another example, a plurality of search spaces may be defined in one CORESET. For example, the CSS and the USS may be configured for the same CORESET. In the following example, the CSS may refer to a CORESET with a CSS configured therefor and the USS may refer to a CORESET with a USS configured therefor, or the like.

An eNB may signal information regarding a CORESET to a UE. For example, a CORESET configuration for each CORESET may be signaled to the UE, and the CORESET configuration may be signaled in time duration (e.g., 1/2/3 symbol) of the corresponding CORESET, a frequency domain resource of the corresponding CORESET, precoder granularity, an REG-to-CCE mapping type (e.g., interleaved/non-Interleaved), a REG bundling size and an interleaver size in the case of an interleaved REG-to-CCE mapping type, and so on.

When REG-to-CCE mapping with respect to 1-symbol CORESET is a non-interleaved type, 6 REGs with respect to a CCE are grouped to one REG bundle and all REGs of the corresponding CCE may be contiguous. When a plurality of CCEs is present in 1 PDCCH (e.g., when an aggregation level is equal to or greater than 2), CCEs may also be contiguous. A UE may assume the same precoding in 1 REG bundle or may assume the same precoding with respect to a plurality of REG bundles.

When REG-to-CCE mapping with respect to 1-symbol CORESET is an interleaved type, 2, 3, or 6 REGs may configure 1 REG bundle. For example, all REG bundle sizes of 2, 3, and 6 are not supported but, as a subset thereof, for example, an REG bundle size of {2}, {3}, {2,3}, {2,6}, {3,6}, or {2,3,6} may be supported. When an REG bundle size of {2, 6} is supported, 2 REGs may configure 1 REG bundle or 6 REGs may configure 1 REG bundle. A UE may assume the same precoding in 1 REG bundle or may assume the same precoding with respect to a plurality of REGs according to precoder granularity.

In the case of REG-to-CCE mapping with respect to a CORESET having duration of 2 symbols or greater, a REG bundle may be defined in time/frequency domain. When an REG bundle is defined in the time domain, all REGs belonging to 1 REG bundle may belong to the same RB and may correspond to different symbols. When an REG bundle is defined in the time-frequency domain, 1 REG bundle may include REGs belonging to different RBs as well as REGs that belong to the same RB and correspond to different symbols.

Time-first mapping may be supported for REG-to-CCE mapping with respect to a CORESET having duration of 2 symbols or greater. An REG bundle may be supported to be configured on the time domain in the same way as time domain duration of a CORESET. In the case of non-interleaved type, 6 REGs included in a CCE may correspond to 1 REG bundle and REGs of the corresponding CCE may be localized in the time/frequency domain. In the case of an interleaved type, 2, 3, or 6 REGs may correspond to 1 REG bundle and REG bundles may be bundled in a CORESET. A UE may assume the same precoding in 1 REG bundle or may assume the same precoding with respect to a plurality of REGs according to precoder granularity.

Time domain precoder cycling with respect to a CORESET having duration of 2 symbols or greater is discussed and, to this end, an REG bundle corresponding to 1 symbol in the time domain or REG-to-CCE mapping may be performed in the same way as in the case of 1-symbol CORESET and mapping of 1 PDCCH candidate over a plurality of symbols may be supported.

According to the above discussion, a bundling region may be determined in the time/frequency domain according to an REG bundling size. However, Inter-REG bundle bundling may not be determined yet in distributed mapping (i.e., interleaving case).

It may be desirable to introduce the REG bundling to enhance channel estimation performance of a control channel. On the other hand, when REG bundling is introduced, a problem in terms of mismatch with CORESET configuration, a problem in terms of increase in blocking probability between control channel candidates belonging to different CORESETs, and so on need to be overcome.

An embodiment of the present invention proposes a solution of the problems. The following examples may be embodied alone or a combination thereof. Hereinafter, a distributed CORESET or an interleaved CORESET may mean that an REG (REG bundle or REG bundle set), etc. configuring one CCE in a corresponding CORESET is distributed and arranged.

Issue 1: Mismatch Between CORESET Bandwidth and REG Bundle

An REG bundle may be configured as 1, 2, 3, or 6-REG (or RB) in the frequency domain and, if a bandwidth (BW) of a CORESET (i.e., size of a CORESET in the frequency domain) is not a multiple of a bundle size, a residual resource that does not belong to an REG bundle may occur. Accordingly, a method of handling a residual resource of a CORESET may be required.

For example, when a CORESET bandwidth is 100 RBs and, in this regard, when a frequency domain bundle size is 3, one REG may remain as a residual resource that is not capable of being used for control channel transmission. When a position of the residual resource is not accurately defined, understanding of REG bundling between a network and a UE may be different and, thus, channel estimation performance may not be ensured and, when different UEs assume different positions of residual resources in the same CORESET, blocking probability between control channel candidates may be increased. Accordingly, methods for overcoming the problems are described below.

(1) Frequency Domain Resource Allocation with Respect to CORESET

To prevent a residual resource from being generated with respect to all bundle sizes (e.g., 2, 3 or 6-REG), frequency domain resource allocation of a CORESET, which is performed in units of 6 RBs, is proposed. 1 REG may correspond to 1 RB in the frequency domain and, in this regard, when a CORESET is allocated in units of 6 RBs which is a least common multiple of all bundle sizes (e.g., 6*N RBs), even if any bundle size of 2, 3, and 6-REG is used, a residual resource is not generated. When a frequency domain bundle size is determined for each CORESET, CORESET resource allocation may also be performed in units of frequency domain bundle sizes.

For example, CORESET resource allocation unit=6 RBs may be defined (or which may be defined as a frequency domain bundle size of a corresponding CORESET) and an REG bundle grid may be configured in resource allocation units in the corresponding CORESET. A network/UE may perform interleaving or the like based on an REG bundle grid.

To allocate a resource of a CORESET in the frequency domain, the following options may be considered.

Option 1: A CORESET resource in the frequency domain may be defined in a combination of a start PRB index (e.g., PRB offset) of a CORESET and the number of resource allocation units for configuring the CORESET. For example, a network may configure PRB index 0 (e.g., start PRB of CORESET) and 20 resource allocation units (e.g., 20*6-PRB) as a CORESET BW. As an example of PRB indexing, a lowermost PRB of a system BW may be configured as PRB index 0. When a system BW is divided into a plurality of sub-BWs (e.g., BWP) and a UE is operated based on a sub-BW, a lowest PRB of each sub-BW may be configured as PRB index 0. For example, PRB indexing may be performed sub-BW specifically. When a plurality of carriers is defined, PRB index 0 may be a lowermost PRB of each carrier or a lowermost PRB of a sub-BW in which the UE is operated among a plurality of sub-BWs included in the carrier but is not limited thereto.

Option 2: Resource allocation unit (or bundle size)-based bitmap

A network may configure a CORESET BW to a UE through a resource allocation unit-based bitmap with respect to the system BW or sub-band which has been described in Option 1. For example, assuming that a resource allocation unit is 6-RB, each bit of a bitmap may correspond to 6-RB.

Option 2 does not conflict with Option 1 and, thus, may also be interpreted as a detailed method of signaling the number of resource allocation units in Option 1. In addition, when PRB is performed sub-BW specifically, the bitmap may be configured sub-BW specifically.

(2) Residual Resource Configuration

When a CORESET resource allocation method that does not prevent a residual resource from being generated is used, a method of determining a position of a residual resource is proposed.

A position of the residual resource may be predefined or may be configured (for each CORESET) by a network. For example, when the residual resource is generated in a specific CORESET, the residual resource may be predefined to be positioned at a start and/or end points of the CORESET or may be configured by a network.

Issue 2: Blocking Problem Between a Plurality of CORESETs

When a plurality of CORESETs is configured for one UE for transmission and reception of an NR PDCCH, different CORESETs may partially overlap with each other. When the CORESETs overlap with each other, if a REG bundle grid is not aligned between CORESETs, a problem may occur in that a REG bundle of a specific CORESET and a plurality of REG bundles of another CORESET. That is, blocking probability may be increased and efficiency of resource use may be seriously degraded.

Figure 2:
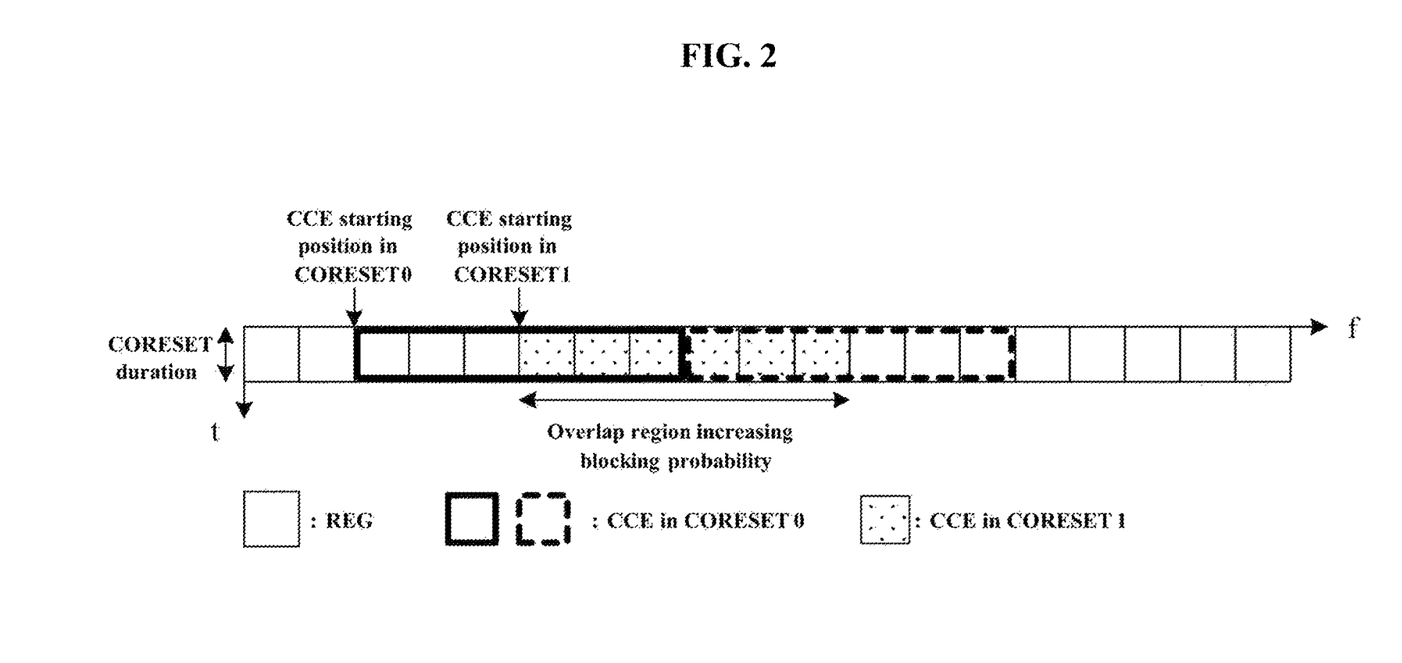
FIG. 2 is a diagram for explanation of a problem that arises when a REG bundle grid between different CORESETs mismatches.

FIG. 2 is a diagram for explanation of a problem that arises when a REG bundle grid between different CORESETs mismatches. CORESET 0 and CORESET 1 overlap with each other and, in this case, it is assumed that duration of CORESET 0 and duration of CORESET 1 are the same, a frequency domain bundle size of CORESET 0 and a frequency domain bundle size of CORESET 1 are the same, and an REG bundle boundary is not aligned between CORESTs.

Referring to FIG. 2, a CCE of CORESET 1 may overlap with 2 CCEs of CORESET 0. Accordingly, when the CCE of CORESET1 is used for a specific UE, a network is not capable of using 2 CCEs of CORESET0, thereby wasting resources. To address the problem, the following methods are proposed.

(3) Boundary Alignment Between REG Bundles Belonging to Different CORESETs

In FIG. 2, there is a problem in that an REG bundle boundary is not aligned between CORESETs to enhance blocking probability and, to address the problem, the following options may be used.

Option 1: Configuration of Offset of Starting Position of REG Bundle for each CORESET For example, a network may configure a starting position of an REG bundle for each CORESET. A UE may determine a bundle boundary in units of bundle sizes configured in a corresponding CORESET from a starting position of an REG bundle configured for each CORESET.

Option 2: Global Reference of Bundle Boundary

To determine a bundle boundary, a global reference may be predefined or may be configured by a network.

For example, a starting position and a synchronization signal (or a PBCH) of a system BW, a starting point or the like of a common resource associated an initial access procedure may be used as a global reference. A UE that knows (or is configured with) a global reference may apply a bundle size from the global reference to determine a bundle boundary of the corresponding CORESET.

A UE may configure a bundle boundary for each CORESET according to Option 1 or 2 above. When a bundle boundary and a boundary of a CORESET mismatch with each other, an REG bundle (e.g., a portion of an REG bundle is out of the boundary of the CORESET) that is not completely included in a CORESET may be assumed not to be used in control transmission.

(4) Bundle Size Alignment Between Overlapping CORESETs

The case in which bundle boundaries between CORESETs having the same bundle mismatch to enhance blocking probability has been described above with reference to FIG. 2 and, thus, even if the bundle boundaries match with each other, when bundle sizes of CORESETs are different, a similar problem to FIG. 2 may occur.

For example, when a bundle size is differently configured for overlapping CORESETs and starting points of bundling are the same, bundle boundaries between CORESETs may match with each other at an interval of a least common multiple of each bundle size and, thus, blocking probability in a corresponding boundary may be enhanced.

To address this, configuration of frequency domain bundles of CORESETs to have the same size when different CORESETs overlap with each other is proposed. For example, the same frequency domain bundle size may be included in CORESET configuration signaled by a network. Alternatively, the frequency domain bundle size may be determined in conjunction with another information element (e.g., CORESET duration) of the CORESET configuration rather than being separately signaled, which means that one of bundle size of the corresponding CORESETs is determined as a representative bundle size.

For example, it may be assumed that CORESET 0 is configured as 1 symbol Duration and CORESET 1 is configured as 2 symbol Duration. When a frequency domain bundle of CORESET 0/1 is 6/3, the representative bundle size may be determined as 3. When CORESET Duration is 2 and time-first mapping is applied (inter-CCE bundling is not applied since 1 CCE includes 6 REG), the frequency domain bundle size may have only 1 or 3 and, thus, it may be interpreted as bundle size 3 is commonly used in two CORESETs.

Issue 3: Blocking Problem Between Different Aggregation Level Candidates of Different CORESETs When a CORESET using interleaving and a CORESET that does not use interleaving do not overlap, there may be the probability that a resource belonging to a high aggregation level (AL) control channel candidate of the CORESET using interleaving blocks a plurality of control channel candidates of the CORESET that does not use interleaving.

Figure 3:
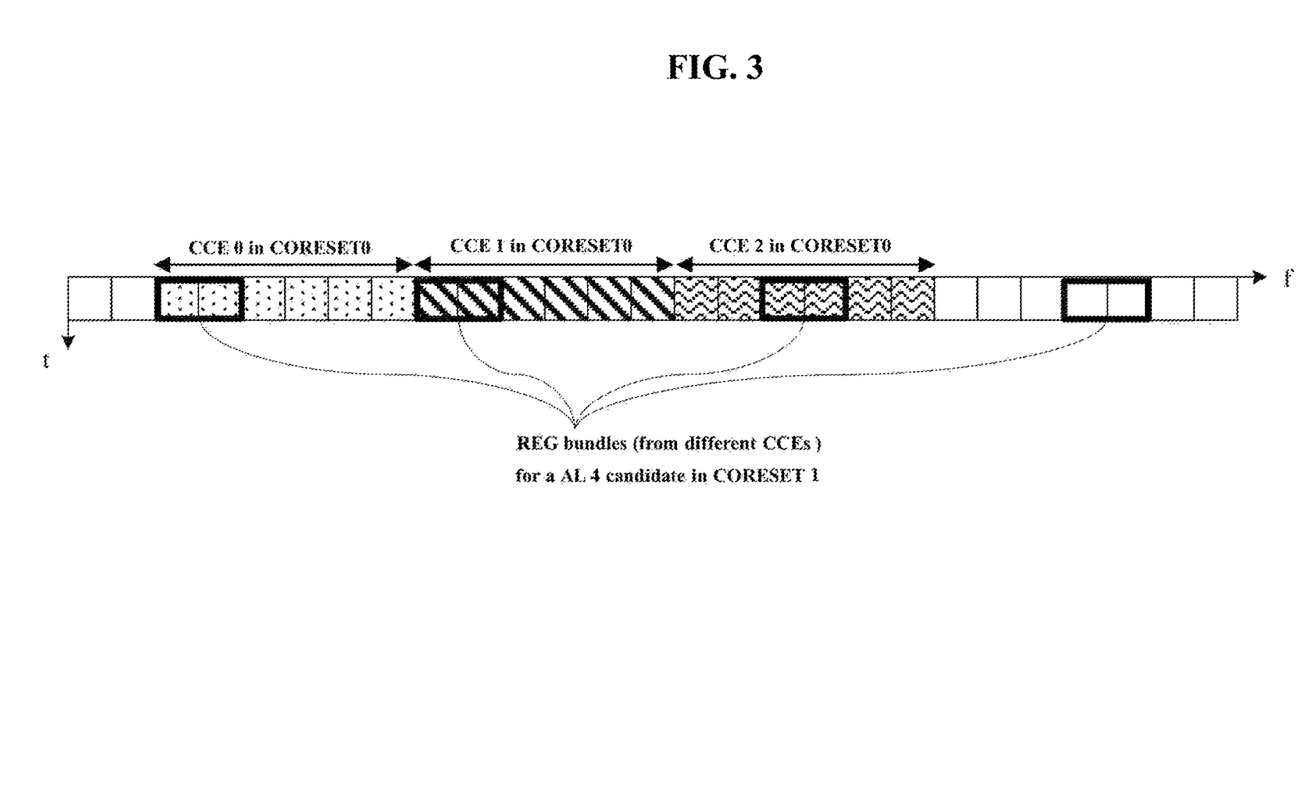
FIG. 3 is a diagram showing an example of blocking between AL candidates belonging to different CORESETs.

FIG. 3 is a diagram showing an example of blocking between AL candidates belonging to different CORESETs.

It may be assumed that interleaving is not used in CORESET 0 and interleaving is used in CORESET 1 and some of resources configuring an AL4 control channel candidate in CORESET 1 are indicated by a solid bold line. It may be assumed that 12 REG bundles with bundle size 2 on the frequency domain in CORESET 1 configure one AL4 control channel candidate and that 12 REG bundles may evenly distributed on the frequency domain.

Although FIG. 3 illustrates blocking of some of resources of CORESET 1, one AL4 control channel candidate of CORESET 1 blocks 12 CCEs of CORESET 0 in a worst case.

On the other hand, a problem may arise in that a high AL control channel candidate of CORESET 0 blocks a plurality of control channel candidates of CORESET 1.

When CORESETs using different mapping methods (e.g., interleaving/non-interleaving) overlap with each other, a method of occupying a resource by a control channel candidate is different for each CORESET and, thus, the blocking problem inevitably occurs. Hereinafter, a method of minimizing the blocking problem is proposed.

(5) REG Bundle Set-Based Interleaving

As seen from FIG. 3, when interleaved-CORESET and non-interleaved CORESETs overlap with each other, if REG bundles configuring one control channel candidate are evenly distributed (in a CORESET) in the case of the interleaved-CORESET, the blocking problem may arise in that control channel candidates of different CORESETs block each other.

As a method of minimizing this, interleaving in units of REG bundle sets is proposed. An REG bundle set may refer to an aggregation of REG bundles configuring different CCEs.

For example, it may be assumed that interleaving is performed on AL2 control channel candidate and an REG bundle size is 2-REG. A network/UE may select 1 REG bundle in each of CCE 0 (=REG bundle0+REG bundle1+REG bundle2) and CCE1 (=REG bundle3+REG bundle4+REG bundle5) which configure AL2 control channel candidate to configure 1 REG bundle set. As a result, 3 REG bundle sets may be generated. For example, like REG bundle set0=REG bundle0+REG bundle3, REG bundle set1=REG bundle1+REG bundle4, REG bundle set2=REG bundle2+REG bundle5, 3 REG bundle sets may be determined. A network/UE may perform interleaving in units of REG bundle sets.

As such, when REG bundle set-based interleaving is performed, AL2 control channel candidate in an interleaved CORESET may block only 3 AL1 control channel candidates of the non-interleaved CORESET. When REG bundles configuring AL2 control channel candidate of the interleaved CORESET are evenly distributed in a CORESET (i.e., interleaving in units of REG bundles), the AL2 control channel candidate of the interleaved CORESET may block 6 AL1 control channel candidates of the non-interleaved CORESET.

When REG bundle set-based interleaving is performed, a size of an REG bundle set may be differently configured according to a target AL. When a network configures an interleaved CORESET to appropriately reflect a channel situation or the like, the network may configure a size (or target AL) of an REG bundle set applied in a corresponding CORESET. This means that, when a size of an REG bundle set is increased, frequency diversity gain is reduced and, when a size of an REG bundle set is reduced, the frequency diversity gain is increased. When bundling between REG bundles is supported, a size of an REG bundle set is increased, which means that channel estimation performance is enhanced. For example, when REG bundle set-based interleaving is performed with a target AL4, 4 REG bundles (which are extracted from 4 CCEs configuring AL4 control channel candidate, respectively) may configure one REG bundle set.

(6) Configurability of Aggregation Levels

When REG bundle set-based interleaving is performed, blocking probability may be lowered compared with the case in which REG bundle unit-based interleaving is performed but, in this case, blocking probability may be increased according to a frequency domain bundle size of a non-interleaved CORESET.

Figure 4:
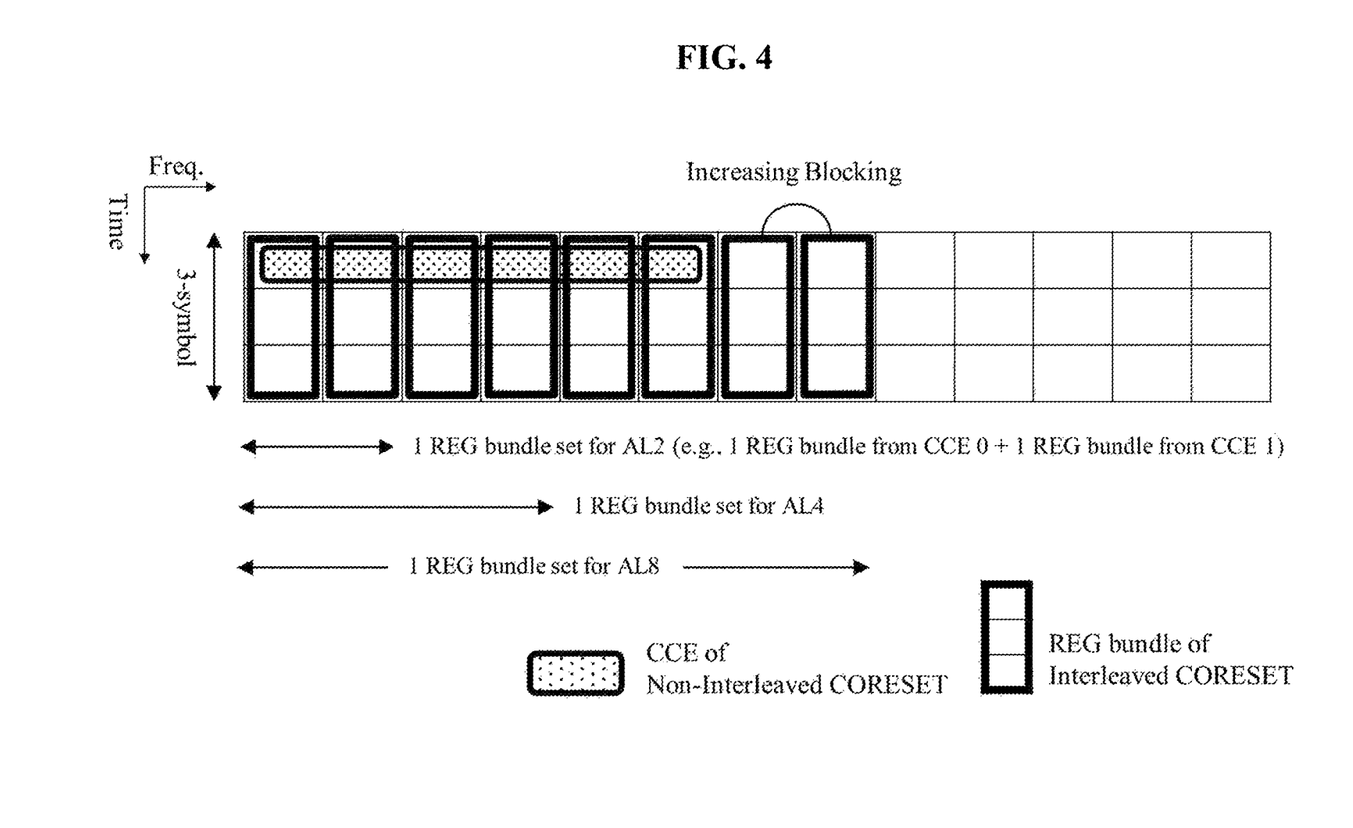
FIG. 4 is a diagram showing another example of blocking between interleaved-CORESET and non-interleaved CORESETs.

FIG. 4 is a diagram showing another example of blocking between interleaved-CORESET and non-interleaved CORESETs. In FIG. 4, it may be assumed that duration of the interleaved CORESET is 3 symbols and duration of the non-interleaved CORESET is 1 symbol.

1 CCE=6 REGs is defined and, thus, when REG bundle set-based interleaving is performed while legacy ALs 1, 2, 4, and 8 are maintained, a frequency domain starting position of each REG bundle set and a frequency domain starting position of a CCE in the non-interleaved CORESET need to be aligned to effectively reduce blocking probability. However, in this case, a resource that is not capable of being used in the interleaved CORESET may be generated.

For example, in FIG. 4, an REG bundle set for an AL4 control channel candidate in the interleaved CORESET may be included in one CCE of the non-interleaved CORESET in the frequency domain but an end point of the REG bundle set may not match with an end of a CCE, thereby wasting a resource.

To reduce resource waste, introduction of AL {1, 3, 6, 12} as well as AL {1, 2, 4, 8} is proposed. However, the present invention is not limited to AL {1, 3, 6, 12} and may not exclude use of other ALs.

When AL {1, 3, 6, 12} is used, an REG bundle set for AL 3, 6, 12 in the interleaved CORESET may block 1/2, 1, and 2 CCEs of the non-interleaved CORESET and, thus, resource waste may be reduced to a maximum degree. AL {1, 3, 6, 12} may be applied only to the interleaved CORESET. A network may configure one of AL sets {1, 2, 4, 8} and {1, 3, 6, 12} with respect to the interleaved CORESET. For example, AL {1, 2, 4, 8} may also be limited only to the case in which a frequency domain bundle size of the CORESET is 3.

As another method, a network may also configure ALs for supporting each CORESET, for each CORESET. For example, an AL available by the network may be {1, 2, 3, 4, 6, 8, 12} and the network may configure some of corresponding ALs in a specific CORESET. Alternatively, AL sets of various combinations may be defined as a table and the network may be configured for each AL set index CORESET in the corresponding table.

Figure 5:
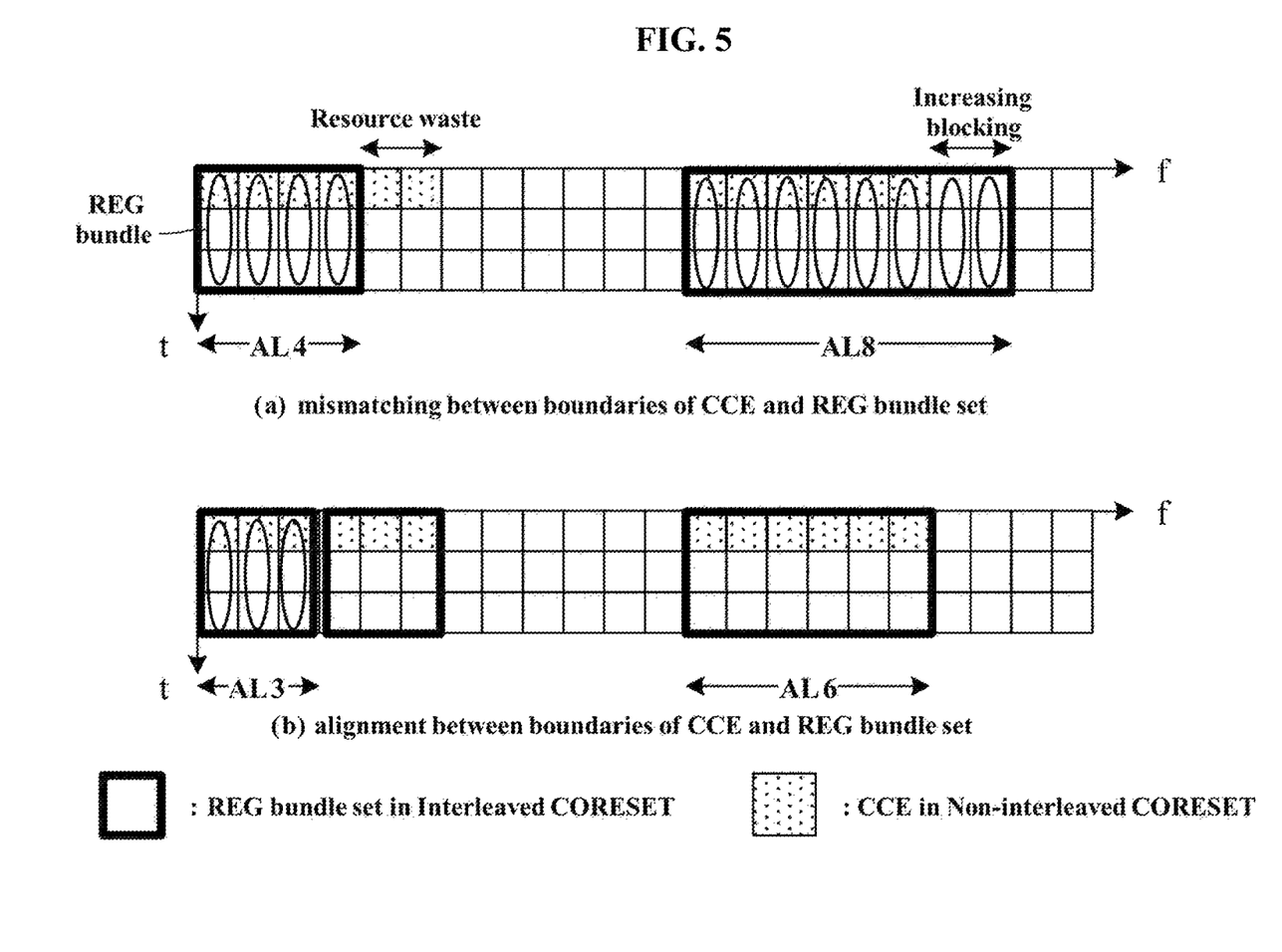
FIG. 5 illustrates a CCE of a non-interleaved CORESET and an REG bundle set of the interleaved CORESET.

FIG. 5 illustrates a CCE of a non-interleaved CORESET and an REG bundle set of the interleaved CORESET.

It may be assume that duration of the interleaved CORESET is 1 symbol, duration of the non-interleaved CORESET is 3 symbols, and 1 symbol Interleaved CORESET is completely included in 3 symbol Non-interleaved CORESETs.

It may be assumed that a bundle size in the non-interleaved CORESET is 1 REG in the time frequency domain and is 3 REGs in the time domain. The number of REG bundles included in an REG bundle set may be assumed to be determined according to a target AL.

(a) of FIG. 5 illustrates a relationship between an REG bundle set for AL 4, 8 in the interleaved CORESET and a CCE of the non-interleaved CORESET. Referring to (a) of FIG. 5, a boundary of an REG bundle set and a boundary of a CCE mismatch and, thus, there is a problem in that resource waste is caused and blocking occurs.

(b) of FIG. 5 illustrates a relationship between a CCE and an REG bundle set for AL 3, 6 when AL 3, 6 in the interleaved CORESET is introduced to configure an REG bundle set. Referring to (b) of FIG. 5, a boundary of an REG bundle set for AL 3, 6 match with a boundary of 1/2 CCE and 1 CCE and, thus, resource waste may be minimized and blocking probability may be lowered. Although not illustrated, a boundary of a REG bundle set for AL 12 matches with a boundary of 2-CCE.

Figure 6:
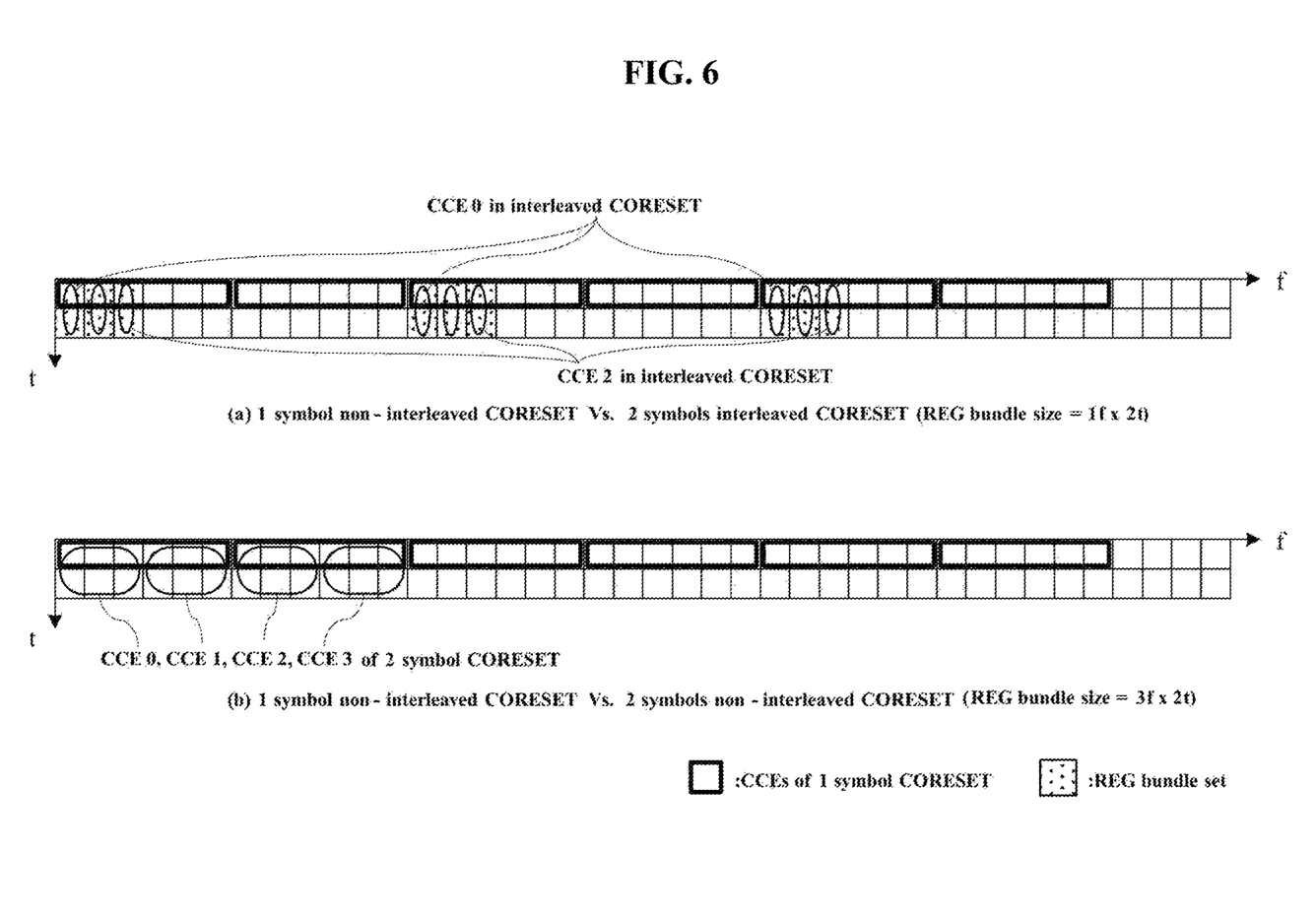
FIG. 6 is a diagram showing the case in which a 1-symbol CORESET and a 2-symbol CORESET overlap with each other according to an embodiment of the present invention.

FIG. 6 is a diagram showing the case in which a 1-symbol CORESET and a 2-symbol CORESET overlap with each other according to an embodiment of the present invention. It may be assumed that the 1-symbol CORESET and the 2-symbol CORESET overlap each other in a 1-symbol CORESET region.

In (a) of FIG. 6, the 2-symbol CORESET may be interleaved in units of REG bundle sets and 3 REG bundles respectively extracted from 3 CCEs configuring an AL3 control channel candidate may configure one REG bundle set. In this case, it may be assumed that an REG bundle size is 1 REG in the frequency domain and 2 REGs in the time domain.

As such, when REG bundle set-based interleaving is performed, a CCE of the 1-symbol CORESET that was blocked by an AL1 control channel candidate of the 2-symbol CORESET may be blocked by an AL3 control channel candidate in the same way. Accordingly, additional blocking due to an increase in AL may not occur. When a network configures AL {1, 3, 6, 12} in the 2-symbol CORESET and performs REG bundle set-based interleaving for AL6, control channel candidates of AL 1, 3, 6 block the same CCE (of 1-symbol CORESET), thereby minimizing blocking probability.

(b) of FIG. 6 illustrates the case in which interleaving is not performed in all CORESETs. In this case, a frequency domain REG bundle size of the 2-symbol CORESET is 3 REGs and, thus, a network needs to configure AL {1, 2, 4, 8} in the corresponding CORESET, thereby advantageously reducing resource waste and lowering blocking probability.

A network may not separately signal a configuration of an AL set (and/or REG bundle set configuration) for each CORESET and the AL set (and/or REG bundle set configuration) for each CORESET may be determined based on a CORESET resource, a bundle size applied to the corresponding CORESET, whether interleaving is performed on the CORESET, and/or configuration of overlapping CORESETs, etc.

For example, when a CORESET with a frequency domain REG bundle size of 1 overleaps with a non-interleaved CORESET as shown in FIG. 6, AL {1, 3, 6, 12} may be predefined to be used and, in this case, an REG bundle set size may also be predefined or configured. This means that an AL set and an REG bundle set are determined in such a way that CCE boundaries, REG bundle boundaries, and/or REG bundle set boundaries, etc. between the overlapping CORESETs may match each other.

(i) to (v) below state determination of an AL set and REG bundle set size according to an embodiment of the present invention and some parameters may be changed.

(i) 1 Symbol Non-Interleaved CORESET & 1 Symbol Interleaved CORESET

When an REG bundle size of 1 symbol interleaved CORESET is 2: AL {1, 3, 6, 12} and REG bundle set size=3 REG bundles may be configured for the 1 symbol interleaved CORESET. AL {1, 2, 4, 8} may be configured for the 1 symbol non-interleaved CORESET.

When an REG bundle size of 1 symbol interleaved CORESET is 3: AL {1, 2, 4, 8} and REG bundle set size=2 REG bundles may be configured for the 1 symbol interleaved CORESET. AL {1, 2, 4, 8} may be configured for the 1 symbol non-interleaved CORESET.

(ii) 1 Symbol Non-Interleaved CORESET & 2 Symbol Interleaved CORESET

When an REG bundle size of the 2 symbol interleaved CORESET is 1 REG in the frequency domain and 2 REGs in the time domain: AL {1, 3, 6, 12} and REG bundle set size=3 or 6 REG bundles may be configured for the 2 symbol interleaved CORESET. AL {1, 2, 4, 8} may be configured for the 1 symbol non-interleaved CORESET.

(iii) 1 Symbol Non-Interleaved CORESET & 2 Symbol Non-Interleaved CORESET

AL {1, 2, 4, 8} may be configured for the 2 symbol non-interleaved CORESET and AL {1, 2, 4, 8} may be configured for the 1 symbol non-interleaved CORESET.

(iv) 1 Symbol Non-Interleaved CORESET & 3 Symbol Interleaved CORESET

When an REG bundle of the 3 symbol interleaved CORESET is 1 REG in the frequency domain and 3 REGs in the time domain, AL {1, 3, 6, 12} and REG bundle set size=3 or 6 REG bundles may be configured for the 3 symbol interleaved CORESET. AL {1, 2, 4, 8} may be configured for the 1 symbol non-interleaved CORESET.

(v) 1 symbol non-interleaved CORESET & 3 symbol non-interleaved CORESET

AL {1, 3, 6, 12} may be configured for the 3 symbol non-interleaved CORESET and AL {1, 2, 4, 8} may be configured for the 1 symbol non-interleaved CORESET.

Figure 7:
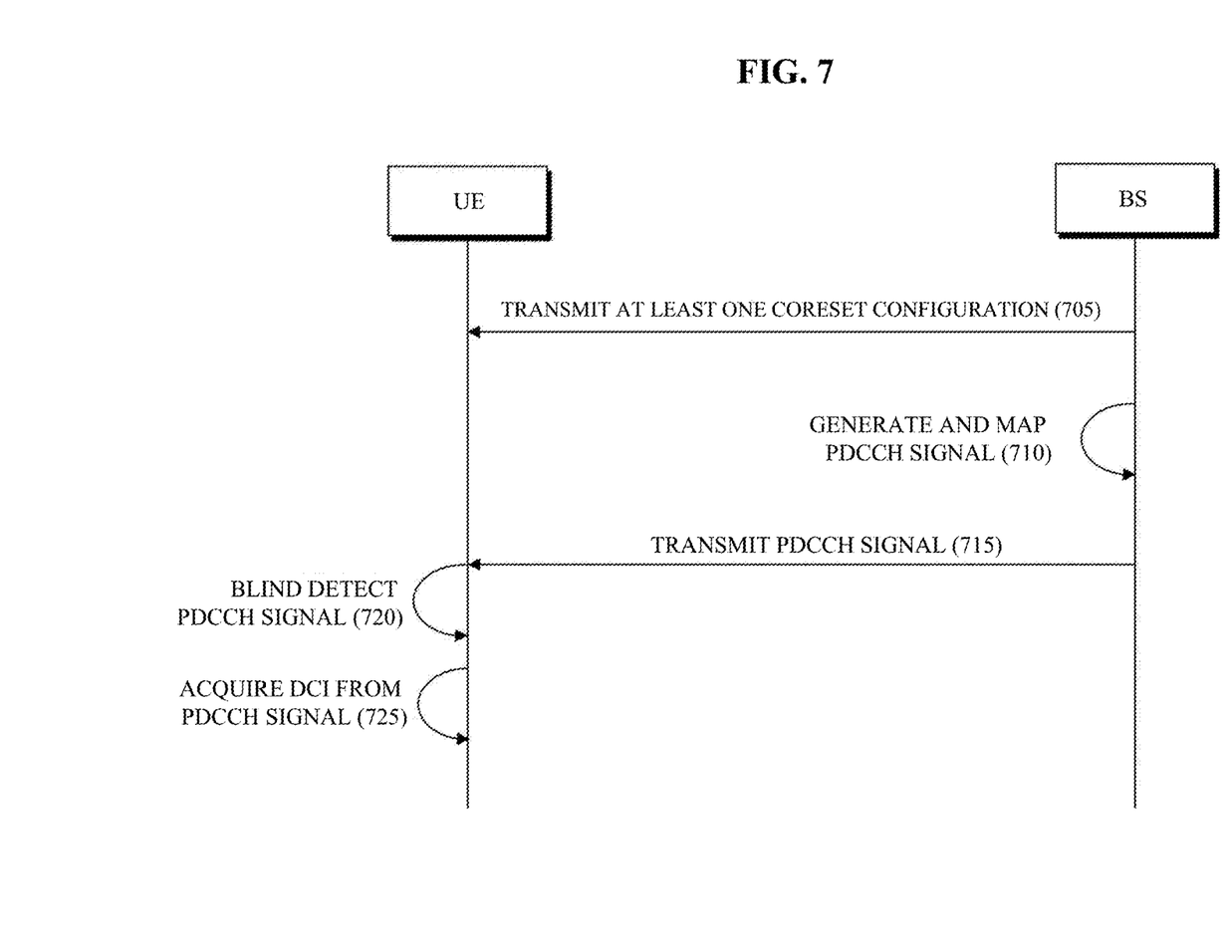
FIG. 7 illustrates a flow of a method of transmitting and receiving a downlink (DL) signal according to an embodiment of the pre sent invention.

FIG. 7 illustrates a flow of a method of transmitting and receiving a downlink (DL) signal according to an embodiment of the present invention. FIG. 7 illustrates an example of the aforementioned methods and the present invention is not limited to FIG. 7 and, thus, a repeated description of the above description may not be given here.

Referring to FIG. 7, a base station may transmit at least one CORESET configuration to a UE (705). For example, the base station may transmit a first CORESET configuration including information regarding a frequency resource of a first CORESET via higher layer signaling (e.g., RRC signaling).

The base station may generate and map a PDCCH signal (710). The base station may map the PDCCH signal on the first CORESET. The base station may map the PDCCH signal by bundling every 2, 3, or 6 REGs into 1 REG bundle. 1 REG may correspond to 1 symbol on the time domain and may correspond to 1 resource block (RB) on the frequency domain. The base station may apply the same precoding at least for the same REG bundle.

The base station may transmit the PDCCH signal (715).

The UE may receive the PDCCH signal by performing blind detection for the PDCCH signal on the first CORESET (720). For example, the UE may receive the PDCCH signal by perform bundling a plurality of REGs on the first CORESET. The UE may assume the same precoding at least for REGs belonging to the same REG bundle.

The UE may acquire DCI from the PDCCH signal (725).

Information regarding a frequency resource of the first CORESET included in the first CORESET configuration may be provided in a bitmap. For example, the bitmap may allocate the frequency resource of the first CORESET in units of 6-RB such that a residual resource that does not belong to any REG bundle is not present in the first CORESET after every 2, 3, or 6 REGs are bundled into 1 REG bundle. Each of a plurality of bits included in the bitmap may correspond to 6-RB and each bit value may indicate whether the corresponding 6-RB is a frequency resource of the first CORESET.

The bitmap may be configured specifically to a sub-band in which the UE operates among a plurality of sub-bands (e.g., BWPs).

The first CORESET configuration may further include REG bundle size information.

An REG bundle size applied to the first CORESET may be determined in consideration of an REG bundle size of the second CORESET that at least partially overlaps with the first CORESET.

When interleaving is configured for only one of the first CORESET and the second CORESET that at least partially overlaps with the first CORESET, interleaving may be performed based on an REG bundle set including a plurality of REG bundles.

The number of the plurality of REG bundles included in the REG bundle set may be determined according to an aggregation level and the plurality of REG bundles may belong to different control channel elements (CCEs), respectively.

With respect to a CORESET for which the interleaving is not configured, from the first CORESET and the second CORESET, only a first aggregation level set {1, 2, 4, 8} may be available and, with respect to a CORESET for which the interleaving is configured, a second aggregation level set {1, 3, 6, 12} as well as the first aggregation level set may also be available.

The aggregation level set to be applied to the first CORESET may be determined in consideration of at least one of a bundle size and whether interleaving is applied, configured for the first CORESET, and a configuration of the second CORESET that overlaps with the first CORESET.

Figure 8:
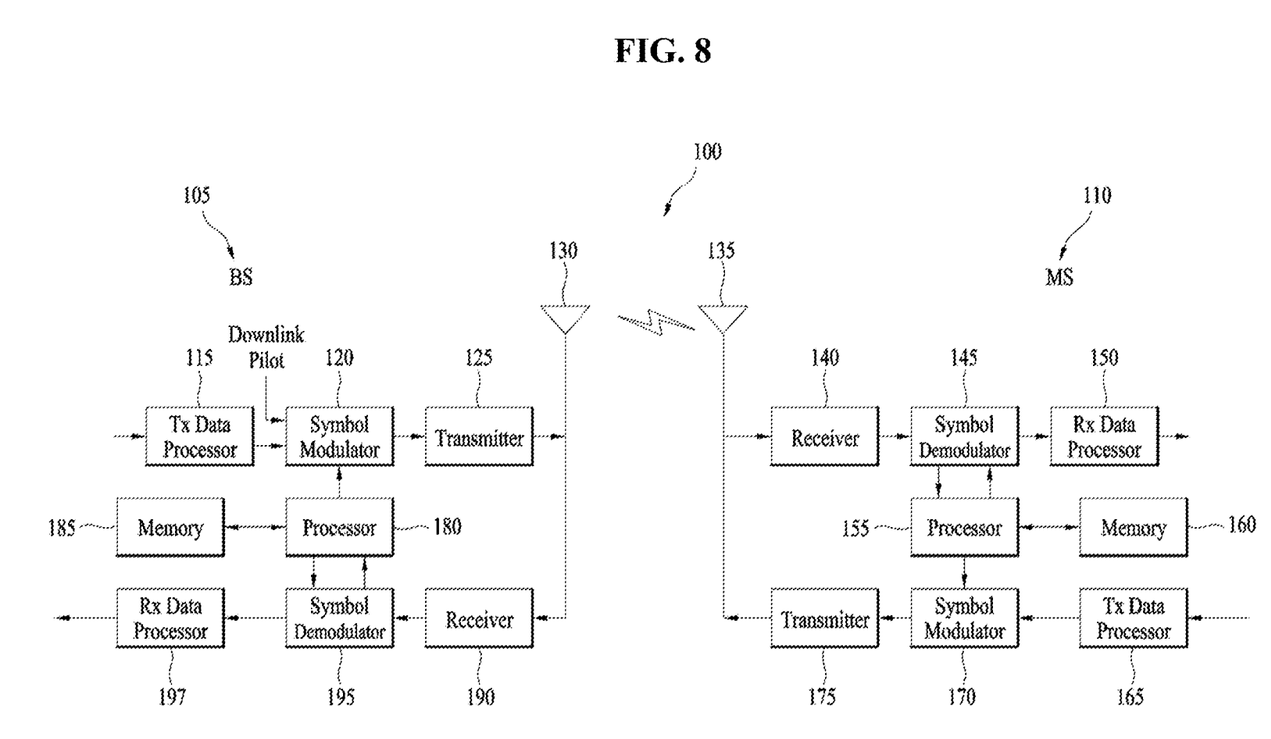
FIG. 8 illustrates a base station (BS) and a user equipment (UE) according to an embodiment of the present invention.

FIG. 8 is a block diagram showing a structure of a base station (BS) 105 and a UE 110 in a wireless communication system 100 according to an embodiment of the present invention. The structure of the BS 105 and the UE 110 of FIG. 8 are merely an embodiment of a BS and a UE for implementing the aforementioned method and the structure of a BS and a UE according to the present invention is not limited to FIG. 8. The BS 105 may also be referred to as an eNB or a gNB. The UE 110 may also be referred to as a user terminal.

Although one BS 105 and one UE 110 are illustrated for simplifying the wireless communication system 100, the wireless communication system 100 may include one or more BSs and/or one or more UEs.

The BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 12, although one antenna 130 is used for the BS 105 and one antenna 135 is used for the UE 110, each of the BS 105 and the UE 110 may also include a plurality of antennas as necessary. Therefore, the BS 105 and the UE 110 according to the present invention support a Multiple Input Multiple Output (MIMO) system. The BS 105 according to the present invention can support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 obtains and processes the stream of symbols to generate an uplink (UL) signal, and the UL signal is transmitted to the BS 105 through the antenna 135. The transmitter and the receiver of UE/BS can be implemented as a single radio frequency (RF) unit.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present invention may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Firmware or software implemented in the present invention may be contained in the processor 155 or 180 or the memory unit 160 or 185, such that it can be driven by the processor 155 or 180.

Radio interface protocol layers among the UE 110, the BS 105, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 110 and the BS 105 may exchange RRC messages with each other through the wireless communication network and the RRC layer.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

As described above, the present invention may be applied to various wireless communication systems.

The invention claimed is:
1. A method of receiving a downlink signal by a user equipment in a wireless communication system, the method comprising:
receiving a first control resource set (CORESET) configuration including information regarding a frequency resource of a first CORESET and information regarding a CORESET time duration of the first CORESET; and
receiving a physical downlink control channel (PDCCH) signal in one or more resource element group (REG) bundles on the first CORESET,
wherein each REG bundle on the first CORESET consists of 2, 3 or 6 REGs of the first CORESET based on an REG bundle size of 2, 3, or 6,
wherein the CORESET time duration is configured to be 2 symbols or 3 symbols,
wherein the size of each REG bundle in a frequency domain is one resource block (RB), 2 RBs, or 3 RBs depending on the REG bundle size and the CORESET time duration,
wherein the information regarding the frequency resource of the first CORESET is a bitmap which is specific to a first subband allocated to the user equipment among a plurality of subbands included in all bands of a corresponding carrier and the bitmap allocates the frequency resource of the first CORESET in the first subband, and
wherein the bitmap allocates the frequency resource of the first CORESET in units of 6 RBs such that the frequency resource does not include any remaining resources which do not belong to any REG bundle, regardless of the size of the one REG bundle in the frequency domain being 1 RB, 2 RBs, or 3 RBs.
2. The method according to claim 1,
wherein each of a plurality of bits included in the bitmap is 6 RBs and each bit value indicates whether the 6 RBs correspond to the frequency resource of the first CORESET.
3. The method according to claim 1,
wherein a same precoding is performed with respect to REGs belonging to at least a same REG bundle.
4. The method according to claim 1,
wherein the first CORESET configuration further includes information regarding the REG bundle size.
5. The method according to claim 1,
wherein the REG bundle size applied to the first CORESET is determined in consideration of an REG bundle size of a second CORESET which overlaps with at least a part of the first CORESET.
6. The method according to claim 1,
wherein, if interleaving is configured only for one of the first CORESET or a second CORESET which overlaps with at least a part of the first CORESET, the interleaving is performed based on an REG bundle set including a plurality of REG bundles.
7. The method according to claim 6,
wherein a number of the plurality of REG bundles which are included in the REG bundle set is determined based on an aggregation level, and
wherein the plurality of REG bundles belong to different control channel elements (CCEs).
8. The method according to claim 6,
wherein only a first aggregation level set {1, 2, 4, 8} is usable for a CORESET for which the interleaving is not configured among the first CORESET and the second CORESET, and
wherein a second aggregation level set {1, 3, 6, 12} is additionally usable for a CORESET for which the interleaving is configured.
9. The method according to claim 1,
wherein an aggregation level set which is to be applied to the first CORESET is configured in consideration of (i)

at least one of the REG bundle size configured for the first CORESET, (ii) application or non-application of interleaving, or (iii) a configuration of a second CORESET overlapping with the first CORESET.

10. The method according to claim 1,
wherein one REG corresponds to one symbol in a time domain and one RB in the frequency domain.

11. A method of transmitting a downlink signal by a base station (BS) in a wireless communication system, the method comprising:
transmitting, to a user equipment, a first control resource set (CORESET) configuration including information regarding a frequency resource of a first CORESET and information regarding a CORESET time duration of the first CORESET; and
transmitting a physical downlink control channel (PDCCH) signal in one or more resource element group (REG) bundles on the first CORESET,
wherein each REG bundle on the first CORESET consists of 2, 3 or 6 REGs of the first CORESET based on an REG bundle size of 2, 3, or 6,
wherein the CORESET time duration is configured to be 2 symbols or 3 symbols,
wherein the size of one REG bundle in a frequency domain is 1 resource block (RB), 2 RBs, or 3 RBs depending on the REG bundle size and the CORESET time duration,
wherein the information regarding the frequency resource of the first CORESET is a bitmap which is specific to a first subband allocated to the user equipment among a plurality of subbands included in all bands of a corresponding carrier and the bitmap allocates the frequency resource of the first CORESET in the first subband, and
wherein the bitmap allocates the frequency resource of the first CORESET in units of 6 RBs such that the frequency resource does not include any remaining resources which do not belong to any REG bundle, regardless of the size of the one REG bundle in the frequency domain being 1 RB, 2 RBs, or 3 RBs.

12. A user equipment for receiving a downlink signal, comprising:
a receiver; and
a processor configured to receive, using the receiver, a first control resource set (CORESET) configuration including information regarding a frequency resource of a first CORESET and information regarding a CORESET time duration of the first CORESET, and to receive, using the receiver, a physical downlink control channel (PDCCH) signal in one or more resource element group (REG) bundles on the first CORESET,
wherein each REG bundle on the first CORESET consists of 2, 3 or 6 REGs of the first CORESET based on an REG bundle size of 2, 3, or 6,
wherein the CORESET time duration is configured to be 2 symbols or 3 symbols,
wherein the size of one REG bundle in the frequency domain is one resource block (RB), 2 RBs, or 3 RBs depending on the REG bundle size and the CORESET time duration,
wherein the information regarding the frequency resource of the first CORESET is a bitmap which is specific to a first subband allocated to the user equipment among a plurality of subbands included in all bands of a corresponding carrier and the bitmap allocates the frequency resource of the first CORESET in the first subband, and
wherein the bitmap allocates the frequency resource of the first CORESET in units of 6 RBs such that the frequency resource does not include any remaining resources which do not belong to any REG bundle, regardless of the size of the one REG bundle in the frequency domain being 1 RB, 2 RBs, or 3 RBs.

13. A base station for transmitting a downlink signal, comprising:
a transmitter, and
a processor configured to transmit, using the transmitter to a user equipment, a first control resource set (CORESET) configuration including information regarding a frequency resource of a first CORESET and information regarding a CORESET time duration of the first CORESET, and to transmit, using the transmitter, a physical downlink control channel (PDCCH) signal in one or more resource element group (REG) bundles on the first CORESET,
wherein each REG bundle on the first CORESET consists of 2, 3 or 6 REGs of the first CORESET based on an REG bundle size of 2, 3, or 6,
wherein the CORESET time duration is configured to be 2 symbols or 3 symbols,
wherein the size of one REG bundle in the frequency domain is 1 resource block (RB), 2 RBs, or 3 RBs depending on the REG bundle size and the CORESET time duration,
wherein the information regarding the frequency resource of the first CORESET is a bitmap which is specific to a first subband allocated to the user equipment among a plurality of subbands included in all bands of a corresponding carrier and the bitmap allocates the frequency resource of the first CORESET in the first subband, and
wherein the bitmap allocates the frequency resource of the first CORESET in units of 6 RBs such that the frequency resource does not include any remaining resources which do not belong to any REG bundle, regardless of the size of the one REG bundle in the frequency domain being 1 RB, 2 RBs, or 3 RBs.

* * * * *